March 25, 1952     C. M. GILBERT     2,590,528

PHASE ADVANCE CIRCUIT

Filed Aug. 19, 1949

Inventor
CLARKE M. GILBERT

By H. S. Mackey
Attorney

Patented Mar. 25, 1952

2,590,528

UNITED STATES PATENT OFFICE 2,590,528

PHASE ADVANCE CIRCUIT

Clarke M. Gilbert, Chappaqua, N. Y., assignor to General Precision Laboratory Incorporated, a corporation of New York Application August 19, 1949, Serial No. 111,127

8 Claims. (Cl. 323—119)

This invention pertains to a phase advance circuit in which an alternating or slowly varying signal input is caused to produce an output which is advanced in phase as respects the input signal.

Although of general utility in a wide range of applications the instant invention is particularly useful in servo circuits wherein an output motor is controlled in shaft displacement or speed and in direction in accordance with an input signal either of alternating or variable direct current. In such devices the input signal, which is varied in accordance with any desired quantity, is usually balanced against a signal derived from the motor, the difference constituting an error signal, and this error or difference signal used as the actuating or motive power of the circuit. Thus when the motor has been actuated sufficiently to produce a signal which exactly balances the input signal, no error signal is present and since no energy is applied to the circuit the motor ceases to rotate having been exactly positioned and made to follow the desired input quantity. Such theoretically perfect following operation presupposes instantaneous operation of the circuit and the motor which is not obtainable in actual practice. On the contrary certain lags in operation are introduced as a result of the inertia of the motor as well as electrical lags inherent in any circuit. In a practical system of this type, therefore, the motor is likely to be actuated beyond the desired point causing it to reverse and oscillate or hunt before coming to rest at the proper point.

The instant invention provides a circuit arrangement which compensates for such defects of operation by advancing the phase of the error signal so that the phase advance compensates for the inherent lag of operation preventing hunting of the system.

In the past various phase advance circuits have been utilized for similar purposes but these circuits usually consist of merely a resistance-capacity network which while performing the function of advancing the phase of the applied signal also has the disadvantage of attenuating the signal at the same time.

In the present invention the error signal is impressed on the input of a discharge tube whose output circuit includes a differentiating network whereby a potential variation is obtained which is the differential of the inverted error signal. This differential potential on being subtracted from the original error signal then yields a potential which is advanced in phase as respects the error signal but which suffers no attenuation thereby. That is to say, the output of the circuit of the invention may be caused to decrease in amplitude more rapidly than the decrease in amplitude of the error signal as the motor approaches its proper position and may even reverse in phase just prior to the proper positioning point so that a braking force is applied to the motor acting against the inertia thereof to insure positioning without overshoot.

Figure 1:
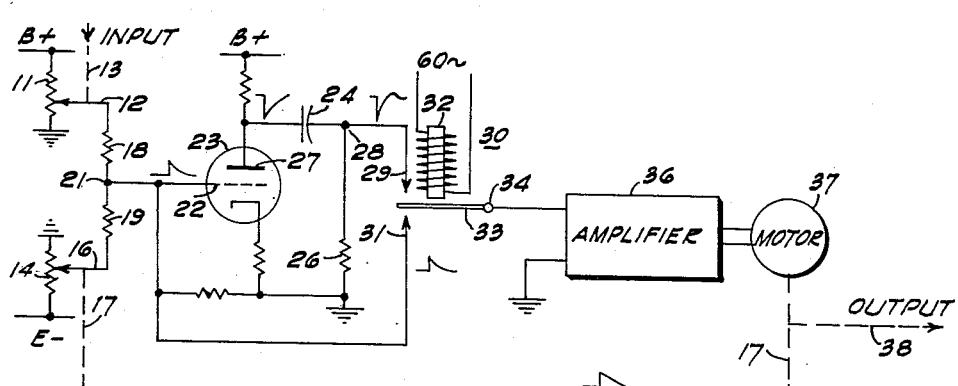
Figure 1 is a schematic diagram of a preferred form of the invention.

Referring now to Fig. 1 the desired input voltage constituting the means of operation of the system is diagrammatically represented as being derived from a potentiometer 11 through the medium of the slider 12 operated by a shaft 13 movable in accordance with any desired input. It will be appreciated of course that the desired variable voltage input signal may be produced by numerous devices well known in the art as for example photoelectric cells, thermocouples, bridge networks and the like to name but a few, the potentiometer and slider being illustrated merely for the purpose of simplicity of explanation.

A second potentiometer 14 having a slider 16 mechanically operated by a shaft 17 constitutes the negative feedback connection from the output of the servomechanism and constitutes a source of signal whose amplitude is proportional to the extent of the servomechanism.

The input signal, derived from the potentiometer 11 and the feedback signal derived from the potentiometer 14 are opposed, to provide an error signal which constitutes the input of the servo system, by a network consisting of resistors 18 and 19 connected in series between the sliders 12 and 16, the junction 21 of which is connected to the control grid 22 of the tube 23.

This error signal amplified and inverted by the tube 23 is impressed on the output circuit thereof consisting of a condenser 24 and resistor 26 connected between the anode 27 and ground. The resistor 26 and condenser 24 constitute a differentiating circuit and the junction 28 thereof is connected to one contact 29 of a single pole double contact relay 30 the remaining contact 31 of which is connected to the junction 21 of the resistors 18 and 19.

The relay 30 is provided with an actuating coil 32 energized from a source of a suitable frequency, for example 60 cycles, so that the armature 33 thereof is caused to alternate or vibrate between the contacts 29 and 31 at the frequency of the supply source. Thus there exists at the terminal 34 an alternating current whose peak amplitudes are alternately that of the contacts 29 and 31. This alternating potential is amplified by the alternating current amplifier 36 and the output thereof is used to energize the motor 37.

Any suitable utilization device may be operated by the shaft 38 connected to the motor shaft 17 and as heretofore stated the shaft 17 positions the sliding contact 16.

The contact 16 is displaced in such a direction that the potential impressed thereon from the source 14 tends to balance that impressed on the contact 12 of the potentiometer 11 when the motor 37 has been rotated to an extent corresponding to the displacement accorded the input shaft 13. That is to say, since the error signal available at the terminal 21 is the difference of the potentials at contacts 12 and 16 when the contact 16 has been moved to such an extent that its potential is exactly equal and opposite to that of the potential existing at contact 12 zero potential exists at the terminal 21 and likewise the input of the amplifier 36 so that no signal is produced in the output thereof to energize the motor 37 and the motor therefore ceases to rotate.

If the signal impressed on the input of the amplifier 36 is not advanced in phase, energization of the motor 37 will not cease until the instant it has reached the position to which actuation is desired by the displacement of the input 13 and since inertia factors are involved the motor 37 will rotate slightly past its desired resting point causing a potential to be impressed on the contact 16 which over-balances that at contact 12 and which produces a potential of the opposite sense and phase at the input of the amplifier 36 so that the motor 37 is caused to reverse. This overshooting of the motor continues in ever decreasing steps until the motor finally comes to rest at the desired point; that is the motor hunts.

The instant invention, however, operates to overcome this defect by the use of the phase advancing circuit which operates to apply a potential of reverse phase to the motor just prior to its proper positioning point so that a braking action is applied thereto and the motor comes to rest without overshoot.

Figure 2:
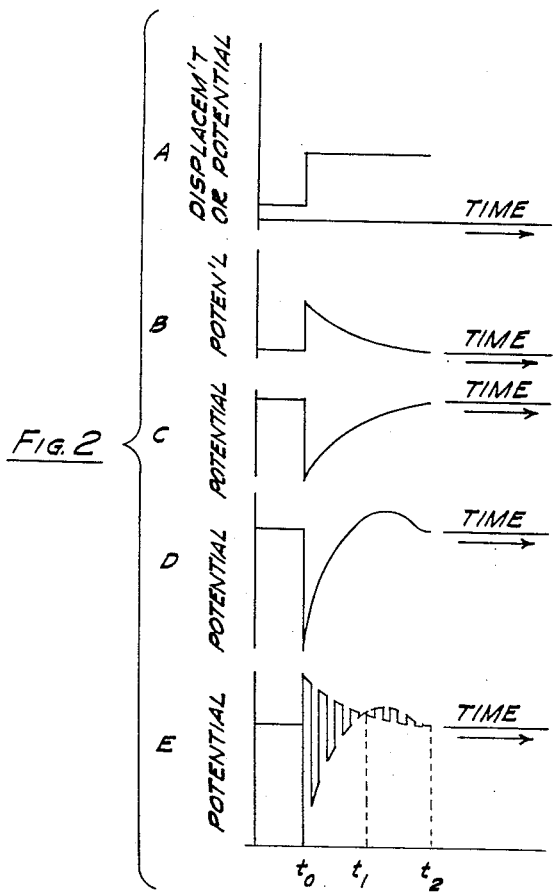
Figure 2 is a group of curves illustrating the operation of the circuit of Fig. 1.

In the system of the instant invention this action is accomplished in a manner which may be made more readily apparent by a reference to the curves of Fig. 2.

Assume for example that the slider 12 (Fig. 1) is suddenly moved from one position to a new position by the shaft 13 producing a sudden increase in the potential at the contact 12 as indicated by the step curve of Fig. 2, A.

Since the slider 16 is not moved instantaneously, the error signal which consists of the difference between the potential at the contact 12 and the contact 16 increases sharply as indicated by the vertical rise of the curve of Fig. 2, B. However the error signal so produced operates through the circuit of the tube 23, vibrator 30 and amplifier 36 to energize the motor 37 which in turn actuates the contact 16 in such a direction as to establish a new balance between the potentials at contact 12 and 16 and thus return the error signal to zero or null. Thus immediately after the sudden increase in error signal there is a gradual decrease thereof towards zero as indicated by the remaining portion of the curve B of Fig. 2.

This error signal is impressed on the input of the tube 23 and is amplified and inverted thereby producing at the anode 27 a potential having the waveform illustrated at C of Fig. 2.

This signal being impressed on the differentiating circuit consisting of condenser 24 and resistor 26 is at least partially differentiated thereby yielding a signal at the terminal 28 and hence contact 29 which has a waveform as illustrated by the curve D of Fig. 2 wherein the potential after being suddenly decreased rises more rapidly than the potential of the anode 27 illustrated by the curve C and may in fact cross the zero axis before returning to zero potential. The exact waveform of course depends somewhat on the circuit constants and if desired the potential illustrated by the curve D may merely be made to approach the zero axis at an increased rate without crossing thereover.

In the present discussion however an actual crossing of the axis is illustrated so that the braking action of the signal is more clearly demonstrated.

The potential applied to the contact 29 then is that illustrated by the curve D of Fig. 2 while the potential applied to the contact 31 obtained from the junction 21 is the error signal applied to the input of the tube 23 and therefore follows the waveform B of Fig. 2.

Inasmuch as the contact 33 vibrates between the contacts 29 and 31 it alternately assumes the potential of the envelopes of the waveforms B and D producing an alternating current as illustrated by the waveform E. It will be noted that from the time $t_0$ to the time $t_1$, the alternating potential so produced has one phase which after amplification by the amplifier 36 tends to rotate the motor 37 in one direction which in turn tends to reestablish a balance and decreases the error signal towards zero. At the time $t_1$ however the waveform D crosses that of waveform B so that from time $t_1$ to time $t_2$ a signal of the opposite phase is impressed on the input of the amplifier 36 and energy is so applied to the motor 37 as to tend to rotate it in the opposite direction. No actual reversal of rotation occurs, however, but instead this small amount of energy acts in opposition to the inertia of the motor producing a braking action which causes the motor to approach and reach its exact intended position without overshoot.

Thus the phase advance circuit of the instant invention accomplishes the function of preventing hunting of the motor and at the same time imposes no attenuation on the error signal, the error signal being compared with the amplified derivative thereof by the vibrator 30 to produce the alternating signal to operate the motor 37.

Figure 3:
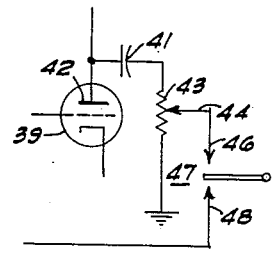
Figure 3 illustrates a modification of a portion of the circuit of Fig. 1.

In those circumstances where it is desired to vary the amount of phase advance employed the circuit disclosed in Fig. 3 may be employed to advantage, only that portion of the circuit of Fig. 1 which is modified being illustrated for simplicity.

In the modification disclosed in Fig. 3 the derivative circuit consisting of condenser 41 and resistor 43 is connected between the anode 42 of the tube 39 and ground, the tube 39 corresponding to tube 23 of Fig. 1. The potential applied to the contact 46 of the vibrator 47, however, is obtained by a slider 44 positioned on the resistor 43 which therefore acts as a voltage divider and hence an adjustable portion of the derivative signal is impressed on the contact 46 which in turn is balanced against the entire error signal impressed on contact 48. The input supplied to the following amplifier and thus to the motor therefor may be made to equal any amount from the error signal alone to the algebraic addition of the error signal and the full derivative signal and the phase advance may be adjusted to any amount from zero to full allowable phase advance, thereby permitting precise adjustments for each individual application.

What is claimed is:

1. A circuit for advancing the phase of a variable electrical signal comprising, means for inverting said signal, means for differentiating said inverted signal, a utilization circuit and means for alternately and successively impressing said electrical signal and at least a portion of said differentiated inverted signal on said utilization circuit whereby an alternating current signal is produced in said utilization circuit the alternate peak amplitudes of which are proportional to the instantaneous amplitudes of said electrical signal and said differentiated inverted signal.

2. A circuit for advancing the phase of a variable electrical signal comprising, a discharge tube having said variable electrical signal impressed on the input thereof producing an amplified output signal which is the inverse of said input signal, a differentiating circuit connected to the output of said discharge tube for differentiating said output signal, a utilization circuit and means alternately and successively impressing said input signal and at least a portion of said differentiated signal on said utilization circuit whereby an alternating current signal is impressed on said utilization circuit the alternate peak amplitudes of which are proportional to the instantaneous amplitudes of said input signal and differentiated signal.

3. A circuit for advancing the phase of a variable electrical signal comprising, a discharge tube having said variable electrical signal impressed on the input thereof producing in the output circuit thereof an amplified inverted signal, a resistance reactance differentiating circuit connected to the output of said discharge tube for differentiating the output signal thereof, a first circuit connected to said differentiating circuit, a second circuit connected to the input of said discharge tube, a utilization circuit and means for alternately and successively energizing said utilization circuit by signals derived from said first and second circuits.

4. A circuit for advancing the phase of a variable electrical signal comprising, a discharge tube having said variable electrical signal impressed on the input thereof producing in its output circuit an amplified inverted signal, a resistance capacitance differentiating circuit connected in the output of said discharge tube for differentiating the output signal thereof, a first stationary contact connected to said differentiating circuit, a second stationary contact connected to the input circuit of said discharge tube, a movable contact and means for causing said movable contact to alternately and successively engage said first and second stationary contacts.

5. A circuit for advancing the phase of a variable electrical signal comprising, a discharge tube having said variable electrical signal impressed on the input thereof producing in its output circuit an amplified inverted signal, a resistance capacitance differentiating circuit connected to the output circuit of said discharge tube for differentiating the output signal thereof, a relay having a single movable contact and a pair of stationary contacts arranged for alternate engagement by said movable contact, a magnetic coil energized by an alternating current source actuating said movable contact between its alternate positions of engagement at the frequency of said alternating current, a direct connection between one of said pair of stationary contacts and said resistance capacitance differentiating circuit and a direct connection between the other of said pair of stationary contacts and the input of said discharge tube.

6. A circuit for advancing the phase of a variable electrical signal comprising, a discharge tube having at least an anode, cathode and control electrode, a circuit for impressing said variable electrical signal on said control electrode, a condenser and resistor connected in series between said anode and cathode, a relay having a movable contact and a pair of stationary contacts arranged for alternate engagement by said movable contact, an actuating coil for said relay energized by an alternating current source actuating said movable contact to its alternate positions of engagement at the frequency of said alternating current, a circuit connecting one of said pair of stationary contacts to the juncture of said condenser and resistor, and a circuit connecting the other of said pair of stationary contacts to said control electrode.

7. A circuit for advancing the phase of a variable electrical signal comprising, a discharge tube having said variable electrical signal impressed on the input thereof producing in its output circuit an amplified inverted signal, a resistance capacitance differentiating circuit connected to the output circuit of said discharge tube for differentiating the output signal thereof, an adjustable contact on said resistance, a first circuit connected to said adjustable contact, a second circuit connected to the input of said discharge tube, a utilization circuit and means for alternately and successively energizing said utilization circuit by signals derived from said first and second circuits.

8. A circuit for advancing the phase of a variable electrical signal comprising, a discharge tube having at least an anode, cathode and control electrode, a circuit for impressing said variable electrical signal on said control electrode, a condenser and resistor connected in series between said anode and cathode, an adjustable contact on said resistor, a relay having a movable contact and a pair of stationary contacts arranged for alternate engagement by said movable contact, an actuating coil for said relay energized by an alternating current source actuating said movable contact to its alternate positions of engagement at the frequency of said alternating current, a circuit connecting one of said pair of stationary contacts to said adjustable contact, and a circuit connecting the other of said pair of stationary contacts to said control electrode.

CLARKE M. GILBERT.

REFERENCES CITED

The following references are of record in the file of this patent:

UNITED STATES PATENTS

| Number | Name | Date |
|---|---|---|
| 2,174,166 | Plebanski | Sept. 26, 1939 |
| 2,462,456 | Bedford | Feb. 22, 1949 |
| 2,508,082 | Wald | May 16, 1950 |